April 23, 1935. W. F. BROWN 1,998,486
PACKAGING OF GLASS
Filed May 9, 1932
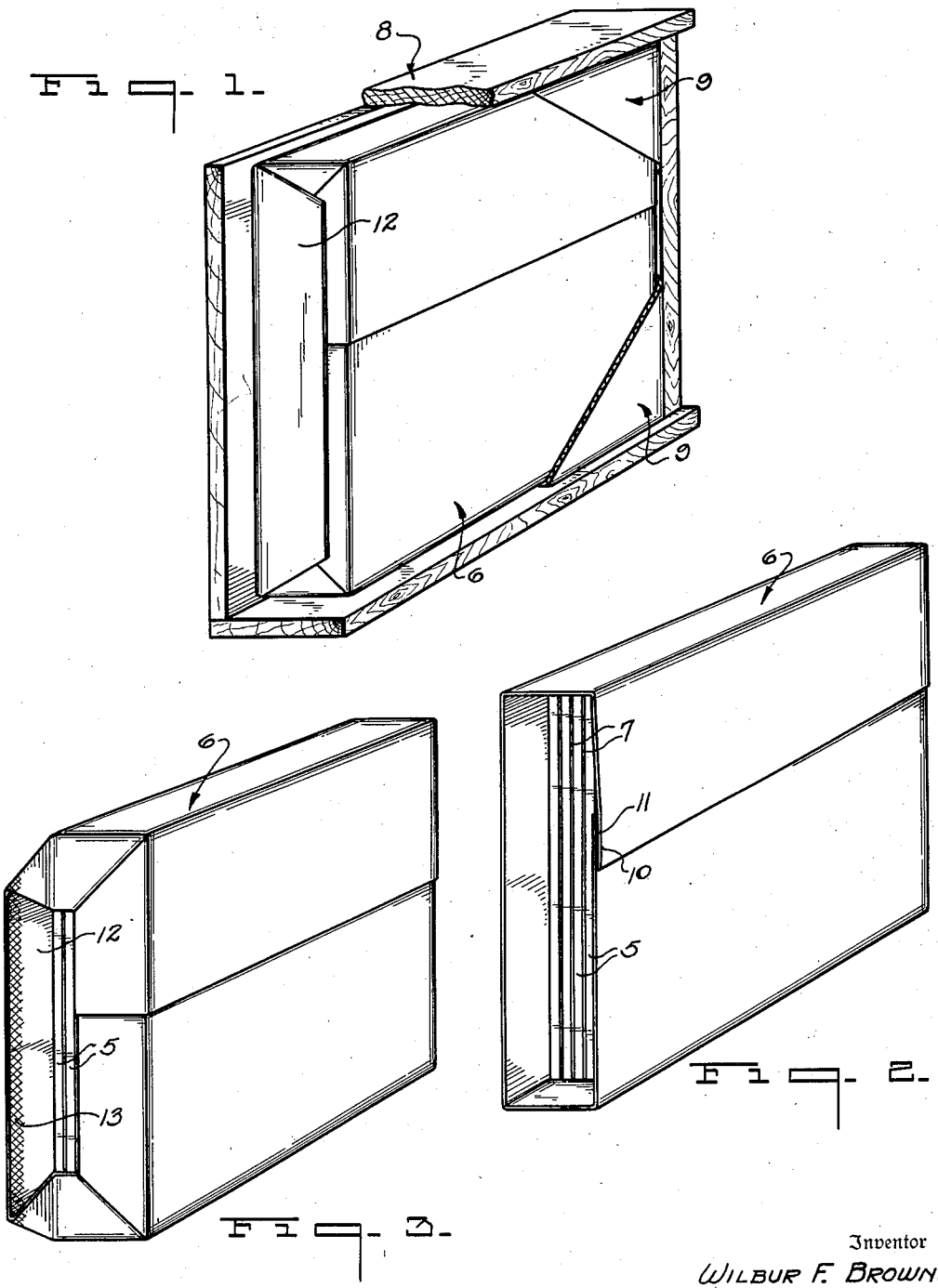
Inventor
WILBUR F. BROWN.
By
Frank Fraser
Attorney Patented Apr. 23, 1935

1,998,486

UNITED STATES PATENT OFFICE 1,998,486

PACKAGING OF GLASS

Wilbur F. Brown, Charleston, W. Va., assignor to Libbey-Owens-Ford Glass Company, Toledo, Ohio, a corporation of Ohio Application May 9, 1932, Serial No. 610,218

6 Claims. (Cl. 206—62)

The present invention relates broadly to the art of packaging, and more particularly to the packaging of glass articles and especially glass sheets.

Heretofore, two general methods commonly termed "paper packing" and "hay packing" have been followed in the packaging of glass sheets. However, when the glass sheets are packed in accordance with either method, the individual sheets of glass are ordinarily maintained spaced from one another by separate sheets of paper. One of the greatest sources of trouble experienced in the packaging of the glass sheets has been the tendency of the glass to become stained or tarnished by the paper in contact therewith during storage, this staining being primarily due to the sweating of the glass sheets. Stained glass is well known to experienced handlers of flat glass and also that glass which has become stained cannot be cleaned by any of the ordinary methods of cleaning. Consequently, glass with even light stain loses most of its market value and badly stained glass is not acceptable to the trade.

An important object of this invention, therefore, resides in the provision of a new and improved method of packing glass sheets wherein all danger of the glass sweating and becoming stained or tarnished during storage will be entirely eliminated.

Another important object of the invention is the provision of such a method wherein a stack of glass sheets are packed within a sealed moisture proof envelope or wrapping completely enveloping the same, and further wherein the individual lights of glass within the envelope or wrapping are maintained spaced from one another by sheets of paper which have been thoroughly dried and are therefore free of all moisture.

Other objects and advantages of the invention will become more apparent during the course of the following description when taken in connection with the accompanying drawing.

In the drawing forming a part of this application and wherein like numerals are employed to designate like parts throughout the same, Fig. 1 is a perspective view illustrating one method of packing glass in accordance with the present invention, Fig. 2 is a perspective view of the moisture proof envelope removed from the wooden shipping container and showing one end of the envelope open, and Fig. 3 is a similar view showing one way in which the ends of the envelope may be folded and sealed.

Briefly stated, in accordance with the present invention, a series or stack of glass sheets 5 are first packed within a sealed moisture proof envelope or wrapping 6 completely enveloping the same, with the individual sheets of glass within the said envelope or wrapping being maintained spaced from one another by sheets of thoroughly dried paper 7. After the glass sheets have been properly packed within the envelope and the said envelope sealed, the stack of sheets is then packed within the wooden shipping container 8. As shown, there may be fitted over each corner of the envelope within the shipping container a protective corner cap 9 preferably formed of corrugated paper.

It is of course to be expressly understood that this invention is not intended to be limited to any specific method of packing the moisture proof envelope containing the stack of glass sheets within the shipping container 8. On the other hand, the invention concerns primarily the packing of the glass within the envelope 6 and the spacing of the individual sheets therein from one another.

As pointed out above, considerable difficulty has been encountered in the staining or tarnishing of the glass sheets during storage and which results primarily from sweating of the glass. However, by packing the glass in accordance with my improved method, all danger of the glass sweating during storage will be obviated, and consequently, the staining of the glass incident to such sweating will be eliminated. This is accomplished by packing the glass sheets first within the moisture proof envelope 6 before packing them in the wooden shipping container 8. The envelope 6 is adapted to be formed of thoroughly water proofed and moisture resistant paper which is entirely free from alkaline. More specifically, I propose to use a thoroughly water proofed non-alkaline kraft paper.

The moisture proof envelope 6 may be made in any desired manner just so long as it completely envelopes and "seals in" the glass. That is to say, the envelope may be purchased from the paper manufacturers open at both ends, or closed at one end and open at the other so that it can be slipped over the stack of sheets, after which the open end can be folded and sealed. On the other hand, if desired, the envelope can be formed by simply wrapping the stack of sheets with a sheet of water proofed kraft paper of a width greater than the length of the sheets as shown in Fig. 2, and of such a length that the opposite ends thereof will overlap one another as indicated at 10, with the said overlapping ends being glued together as at 11. The opposite ends of the envelope or wrapping can then be folded in any well known manner, such as shown in Figs. 1 and 3, and the folds or flaps 12 glued down with a suitable glue 13.

I also intend that the sheets of paper 7 which are used to maintain the individual sheets of glass 5 spaced from one another shall be treated before use in such a manner that they are thoroughly air dry. It have found that under certain atmospheric conditions, paper heretofore used in the packaging of glass sheets to separate each light of glass may contain enough moisture to cause some staining of the glass after the glass has been stored for some length of time. Therefore, the sheets of spacing paper 7 are adapted to be thoroughly dried before using.

It is also desirable that the glue used in the making of the envelope and in sealing the ends thereof be of such a nature that it will have no adverse effect upon the glass. For instance, a glue including sodium silicate should not be used for the reason that there is a tendency for this type of glue to stain the glass. My investigations have shown that while a non-alkaline or vegetable glue can be successfully used without adversely affecting the glass, the best and most practical glues for this purpose are those containing borax. I therefore may use either a non-alkaline glue or a glue the alkalinity of which comes only from borax. That is to say, the glue should contain no trace of sodium silicate. As an example of a permissible alkaline glue, the following may be used:

|  | Lbs. |
|---|---|
| Dextrine | 160 |
| Borax | 25 |
| Water | 300 |

Preservative as desired, for example, ½ lb. sodium benzoate or ¼ lb. phenol.

I have found that if the glass sheets are packed in a moisture proof envelope of water proofed kraft paper, and also that if the paper used to separate the individual lights of glass is thoroughly dried before use, the glass cannot possibly sweat when packed in the wooden shipping container, even under the most severe adverse conditions. Consequently, the glass so packed will never become stained in storage.

I claim:

1. In the art of packaging glass sheets, the method consisting in first packing a plurality of sheets in a moisture proof envelope, placing the pack of sheets within a wooden shipping container, and in fitting over each corner of the pack of sheets within the said container a protective corner cap of corrugated paper.

2. In the art of packaging glass sheets, the method consisting in first packing a plurality of sheets in a moisture proof envelope, maintaining the individual lights of glass within the envelope spaced from one another by sheets of thoroughly air dry paper, placing the pack of sheets within a wooden shipping container, and in fitting over each corner of the pack of sheets within the said container a protective corner cap of corrugated paper.

3. In the art of packaging glass sheets, the method consisting in first completely enveloping a plurality of sheets with a water-proofed paper, placing the same in a shipping container, and in fitting over each corner of the pack of sheets within the said container a protective cap of corrugated paper.

4. In the art of packaging glass sheets, the method consisting in first completely enveloping the sheets with a non-alkaline water-proofed, moisture resistant paper, placing the same in a shipping container, and in fitting over each corner of the pack of sheets within the said container a protective cap of corrugated paper.

5. In the art of packaging glass sheets, the method consisting in first completely enveloping a plurality of sheets with a water-proofed paper, maintaining the individual lights of glass spaced from one another by sheets of thoroughly air-dry paper, placing the same in a shipping container, and in fitting over each corner of the pack of sheets within the said container a protective cap of corrrugated paper.

6. In the art of packaging glass sheets, the method consisting in first completely enveloping the sheets with a non-alkaline water-proofed, moisture resistant paper, maintaining the individual lights of glass spaced from one another by sheets of thoroughly air-dry paper, placing the same in a shipping container, and in fitting over each corner of the pack of sheets within the said container a protective cap of corrugated paper.

WILBUR F. BROWN.